3,033,896
PREPARATION OF SULPHONATED MALEIC ACID ESTERS OF IMPROVED COLOR

Robert J. Anderson, Metuchen, N.J., assignor to General Aniline & Film Corporation, New York, N.Y., a corporation of Delaware
No Drawing. Filed Mar. 9, 1960, Ser. No. 13,728
10 Claims. (Cl. 260—481)

This invention relates to a novel method for improving the color of compounds such as synthetic detergents made by the sulphonation of esters of maleic anhydride. More particularly, this invention relates to a process of improving the color of sulphonated esters of maleic acid by the use of metal phosphates.

The preparation of compounds of this type is disclosed in U.S. Patents 2,028,091 and 2,176,423, by Alphons O. Jaeger. These patents describe the sulphonation of esters of maleic anhydride by means of sodium bisulfite. These esters, particularly in the form of their alkali forming metal salts, are of great importance in industry by reason of their extraordinary wetting powers in various aqueous and organic solutions, emulsions or suspensions. They are also of importance as detergents, emulsifying agents, and the like. These compounds form somewhat viscous, free-flowing, clear solutions.

The preparation of sulphonated maleic acid esters of this type is graphically illustrated by the following general equation:

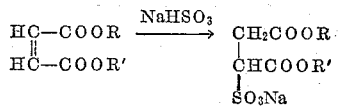

wherein R and R' represent alkyl groups, either alike or dissimilar, containing from three to eight carbon atoms.

A typical manufacturing process for producing detergent compounds of the type under consideration is as follows:

370 parts of dimethylheptylmaleate, 449 parts of sodium bisulfite solution and 87 parts of anhydrous sodium sulfite are heated to reflux at 102–105° C. for 16–20 hours. The finished sulphonation product is cooled to 90° C., thinned out with alcohol and the sulponated oil separated from the mother liquor. The oil is then diluted with water and alcohol to desired strength based on the wetting and active ingredient.

Water-white products are made only with difficulty by prior art process. Frequently the final product has a strong yellow color (Hellige:>100). Color formation is caused mainly by (1) iron contamination from equipment in both the manufacture of the ester and the sulphonated reaction mixture, (2) poor separation of reaction mixture and mother liquor after sulphonation, and (3) the presence of organic materials and other miscellaneous contaminants of an obscure and unknown nature.

In order to gain sales appeal, the finished product must be clear and water-white; accordingly, various attempts have been made to improve the color of the product such as by Darco filtration or by treatment with hydrogen peroxide. It has been found, however, that Darco filtration is too slow to be used commercially and that undesirable losses of the material occur.

Hydrogen peroxide has been found to be effective in reducing color to an acceptable maximum (Hellige: 70); however, the following difficulties accompanied the use of this oxidizing agent:

(1) The effect of peroxide was not consistent, i.e. the amount needed varied from batch to batch with varying degrees of success; a maximum of 1% peroxide would not always lower color.

(2) The time cycle for adjusting batches was increased by about 24 hours. The optimum pH for use of peroxide is 8–9; but frequently the pH had to be readjusted because the peroxide lowers the pH by 1 to 3 units. Therefore, the peroxide had to be added stepwise to accommodate pH requirements.

(3) Clarity and temperature stability were sometimes adversely affected by use of peroxide.

(4) Peroxide destroys dyestuffs and perfumes and is, therefore, not commercially acceptable when the detergent is to be used with perfumes or dyestuffs.

It is an object of this invention to provide a novel and commercially acceptable process for improving the color of synthetic detergent compounds.

It is a further object of this invention to provide a novel process for improving the color of sulphonated esters of maleic acid by treatment with metal phosphates.

Other objects and advantages of this invention will appear to those skilled in the art from the detailed description thereof given below.

I have discovered that a distinct color advantage can be gained in the manufacture of sulphonated esters of maleic acid by treatment with metal phosphates after the separation of the sulphonated oil and mother liquor from the mixture of the same obtained, for example, by reacting an alkyl maleate with sodium bisulfite in an aqueous medium. The time necessary for the novel decolorizing procedure of my invention using metal phosphates is approximately two hours as against twenty-four hours, the time required when using hydrogen peroxide.

By the use of (1) monobasic sodium phosphate, sodium pyrophosphate, sodium metaphosphate, and disodium pyrophosphate and (2) potassium orthophosphate, potassium hydrogen phosphate, potassium dihydrogenphosphate, potassium metaphosphate, and potassium pyrophosphate color can be effectively removed from any maleate, such as diamylmaleate, diisobutylmaleate, dioctylmaleate, and dimethylheptylmaleate. The effectiveness in removing color improves with the number of atoms of alkali-forming metals per molecule of phosphate, viz. potassium pyrophosphate removes more color than potassium dihydrogenphosphate. Preferably the amount of metal phosphate employed is from .1 to .15 part per part by weight of the sulphonated ester of maleic acid being treated.

The following examples illustrate my novel method of decolorizing the sulponated esters of maleic acid. It is to be understood, however, that these examples are given by way of illustration and not by way of limitation.

Example 1

300 parts by weight of sulphonated dimethylheptylmaleate (oil) was charged into a suitable vessel and 0.3 part by weight of sodium pyrophosphate was added with stirring.

The mixture was stirred at 25–30° C. for 1 hour. The sodium pyrophosphate dissolved very slowly but with evident lightening of original strong yellow color.

Example 2

To 300 parts by weight of sulphonated oil of Example 1 was added 20 parts by weight of water and 1 part by weight of isopropanol and the mixture was stirred. Hellige of diluted sample: »100.

To the diluted sample was added 0.3 part by weight of sodium pyrophosphate and the mixture was stirred for ½ hour with gradual decrease in color. Hellige of treated sample: 40.

Example 3

When the same procedure and weight ratios of materials as in Example 2 were employed, except that 0.15 part of sodium pyrophosphate was used, the treated sample had a Hellige of 50+.

Example 4

When the same procedure and weight ratios of materials as in Examples 2 and 3 were employed, except that 0.15 part of potassium pyrophosphate were used, the Hellige of the treated sample was 50+.

Example 5

To 300 parts by weight of sulphonated dimethylheptylmaleate, diluted with water and alcohol (Hellige: >100) was added 0.15 part by weight of potassium pyrophosphate dissolved in 1.0 part by weight of water. The mixture was stirred for approximately 5 minutes.

Color change from yellow to white was almost instantaneous. Hellige of treated sample: 60+.

Example 6

To 300 parts by weight of sulphonated ester, partially diluted with water and alcohol, (Hellige: 100) was added 0.3 part by weight of sodium phosphate dibasic dissolved in 3 parts by weight of water. The mixture was stirred until clear. Hellige of treated sample: 90.

Exmple 7

When the same procedure and weight ratios as in Example 6 were employed, except that monobasic potassium phosphate was used, the Hellige of the treated sample changed only slightly: from »100 to 100—.

Modifications of my invention will occur to persons skilled in the art. I, therefore, do not intend to be limited in the patent granted except as necessitated by the appended claims.

I claim:

1. A method of improving the color of a sulphonated ester of maleic acid which comprises treating said ester with about 0.001 to about 0.0005 part by weight of an alkali metal phosphate to about 1 part by weight of the ester.

2. A method as recited in claim 1 wherein the alkali metal phosphate is a potassium phosphate.

3. A method as recited in claim 2 wherein the potassium phosphate is potassium pyrophosphate.

4. A method as recited in claim 1 wherein the alkali metal phosphate is a sodium phosphate.

5. A method as recited in claim 6 wherein the sodium phosphate is sodium pyrophosphate.

6. A method as recited in claim 1 wherein the sulphonated ester is sulphonated dimethylheptylmaleate.

7. A method of improving the color of a sulphonated ester of maleic acid which comprises diluting the ester with water and mixing about 0.001 to about 0.0005 part by weight of an alkali metal phosphate with about 1 part by weight of the diluted ester.

8. A method as recited in claim 7 wherein the proportion of alkali metal phosphate to ester in the mixture is about .15 to .3 part by weight of the phosphate to about 300 parts by weight of the ester.

9. A method as recited in claim 7 wherein the alkali metal phosphate is sodium pyrophosphate.

10. A method as recited in claim 7 wherein the alkali metal phosphate is potassium pyrophosphate.

References Cited in the file of this patent

UNITED STATES PATENTS

| | | |
|---|---|---|
| 2,028,091 | Jaeger | Jan. 14, 1936 |
| 2,176,423 | Jaeger | Oct. 17, 1939 |